Patented Apr. 17, 1934

1,954,835

UNITED STATES PATENT OFFICE 1,954,835

CRYSTALLIZING VARNISH

William O. Stauffer, Wilmington, Del., assignor to E. I. du Pont de Nemours & Company, Wilmington, Del., a corporation of Delaware No Drawing. Application February 11, 1929, Serial No. 339,272

16 Claims. (Cl. 134—26)

This invention relates to the art of coating compositions and, more particularly, to crystallizing varnishes.

Crystallizing varnishes have heretofore been made by running a resin at a high temperature (300–350° C.) to render it compatible with drying oils, adding China-wood oil to the melted resin and heating. When such varnishes are applied as a film and the latter is exposed for 15 to 30 minutes to a warm atmosphere produced in an oven by means of luminous flames, a frosted pattern develops, and this is hardened by baking at a higher temperature in an ordinary baking oven. Films prepared in this way, however, do not always produce the same effect due to the difficulty of accurately controlling the temperature and the danger of gelling China-wood oil when large quantities of it are cooked at the high temperatures required in the old process.

I have discovered that if the natural resin is replaced by polyhydric alcohol-polybasic acid resins, and these are dissolved in suitable solvents, they are compatible and blendable in the cold with bodied China wood oil, either heat treated or blown, and crystallizing varnishes or enamels can be prepared therefrom which will give uniform results from batch to batch.

It is therefore an object of this invention to provide a new process of producing a crystallizing varnish.

It is another object of this invention to provide a new process of producing a frosted, crinkled, or patterned film.

It is still another object of this invention to provide a new crystallizing varnish.

With the above and other objects in view, which will be apparent as the description proceeds, I have set forth my invention in the following specification and have included the following examples by way of illustration and not as a limitation.

Example 1

Polyhydric alcohol-polybasic acid resin

| | |
|---|---|
| (Glycerol | 17.59 |
| Phthalic anhydride | 28.79 |
| China-wood oil acids | 53.62 |
| | 100.00) |

| | Parts by weight |
|---|---|
| | 19 |
| Blown China-wood oil | 38 |
| Cobalt drier solution | 5.5 |
| Solvent naphtha | 9.5 |
| High boiling gasoline | 28.0 |
| | 100.0 |

Example 2

Polyhydric alcohol-polybasic acid resin

| | |
|---|---|
| (Glycerol | 22.73 |
| Phthalic anhydride | 46.31 |
| Linseed oil acids | 30.96 |
| | 100.00) |

| | Parts by weight |
|---|---|
| | 19.0 |
| Blown China-wood oil | 38.0 |
| Cobalt drier solution | 5.5 |
| Toluol | 9.5 |
| High boiling gasoline | 28.0 |
| | 100.0 |

Example 3

Polyhydric alcohol-polybasic acid resin

| | |
|---|---|
| (Glycerol | 15.13 |
| Phthalic anhydride | 37.26 |
| Rosin | 57.61 |
| | 100.00) |

| | Parts by weight |
|---|---|
| | 19.0 |
| Blown China-wood oil | 38.0 |
| Manganese drier solution | 5.5 |
| Solvent naphtha | 2.5 |
| High boiling gasoline | 35.0 |
| | 100.0 |

Example 4

Polyhydric alcohol-polybasic acid resin

| | |
|---|---|
| (Glycerol | 17.59 |
| Phthalic anhydride | 28.79 |
| China-wood oil acids | 53.62 |
| | 100.00) |

| | Parts by weight |
|---|---|
| | 16.0 |
| Blown China-wood oil | 32.0 |
| Cobalt drier solution | 5.0 |
| Solvent naphtha | 8.0 |
| High boiling gasoline | 24.0 |
| Chrome green pigment | 15.0 |
| | 100.0 |

Crystallizing varnishes of the types indicated above are preferably made by cutting the hot polyhydric alcohol-polybasic acid resin with a solvent, adding the oil and drier, thoroughly mixing these ingredients, and then cutting the varnish with a high boiling gasoline. The temperature of the polyhydric alcohol-polybasic acid resin at the time it is cut varies with the particular solvent used, but is generally between 150 and 200° C., 200° C., being used with solvent naphtha.

When a pigmented product is desired, as in Example 4, the varnish prepared as indicated above is ground with the desired pigments in a ball mill or other suitable paint grinding mill.

The varnishes produced in accordance with my invention may be applied as a film, heated gently (for example to 60-70° C.) to produce the frosted pattern desired, and then baked at higher temperatures (for example to 100-150° C.) to harden the film, as in the case of the previous crystallizing varnishes, but such patterns can be made uniform, however, owing to the fact that the bodying of the oil can be accurately controlled and effected at low temperatures.

While the above examples only indicate a few examples of polyhydric alcohol-polybasic acid resins, I desire to have it understood that the general class of polyhydric alcohol-polybasic acid resins disclosed herein is applicable for use according to my invention.

I also desire to have it understood that my invention is not limited to the use of solvent naphtha or toluol as a solvent medium, as aromatic hydrocarbons in general, as well as combinations of aromatic and aliphatic hydrocarbons, such as solvent naphtha and high boiling gasoline, are suitable for this purpose. Similarly, what I have called high boiling gasoline may be replaced by materials known to the trade as mineral thinner, petroleum distillate, or turpentine substitute, and these materials will be referred to generally as volatile aliphatic thinners.

Inasmuch as the resin is usually cut hot it is usually blended with the oil without resorting to cooling, but where the polyhydric alcohol-polybasic acid resin is such that it may be cut cold the oil may be blended cold. Likewise, if desired, the mixture of polyhydric alcohol-polybasic acid resin, oil, solvent, drier, and volatile thinner may be heated moderately (for example to 150-200° C.) to accelerate the mixing process.

Although heat treated China-wood oil may be used, I prefer to use blown China-wood oil. Furthermore, while I prefer to use a treated China-wood oil-modified polyhydric alcohol-polybasic acid resin ratio of 2:1, I do not desire to be limited to this ratio as other ratios, within the range of 1.5:1 to 2.5:1, will generally give satisfactory results.

The cobalt drier solutions used in the above examples are solutions of cobalt linoleate in turpentine containing about .75% cobalt as metal. The manganese drier solution used in Example 3 is a turpentine solution containing 1.5% manganese as metal. Other well known driers may be substituted for the cobalt and manganese driers set forth above, although lead driers are generally less satisfactory than cobalt or manganese driers or mixtures of driers.

It will therefore be apparent that I have produced a new class of crystallizing varnishes and a new process of making them which will give predetermined uniform patterns, depending on the resin used, the amount of treatment to which the oil has been subjected, the viscosity of the varnish, and the volatile thinner used, and such varnishes can also be produced more cheaply than those heretofore available because the preparation is simpler and because unsatisfactory results are eliminated.

As many apparently widely different embodiments of this invention may be made without departing from the spirit and scope thereof, it is to be understood that I do not limit myself to the specific embodiments thereof except as defined in the appended patent claims.

I claim:

1. The process of making a crystallizing varnish which comprises cutting a polyhydric alcohol-polybasic acid resin with an aromatic hydrocarbon solvent, adding heat treated China-wood oil and drier, mixing these ingredients, and cutting the varnish with volatile aliphatic thinner, the polyhydric alcohol-polybasic acid resin used being a reaction product of a polyhydric alcohol, a polybasic acid, and a member of the group which consists of drying oil acids, drying oils, and rosin.

2. The process of making a crystallizing varnish which comprises cutting a hot polyhydric alcohol-polybasic acid resin with an aromatic hydrocarbon solvent, adding blown China wood oil and drier, mixing these ingredients, and cutting the varnish with volatile aliphatic thinner, the polyhydric alcohol-polybasic acid resin used being a reaction product of a polyhydric alcohol, a polybasic acid, and a member of the group which consists of drying oil acids, drying oils, and rosin.

3. The process of claim 2 in which the aromatic hydrocarbon solvent is solvent naphtha.

4. The process of claim 2 in which the volatile aliphatic thinner is high boiling gasoline.

5. The process of claim 2 in which the aromatic hydrocarbon solvent is solvent naphtha and the volatile aliphatic thinner is high boiling gasoline.

6. The process of claim 2 in which the drier is cobalt linoleate.

7. The process of claim 2 in which the mixture is heated moderately to accelerate mixing prior to cutting with the volatile aliphatic thinner.

8. The process of making a crystallizing varnish which comprises cutting a hot China-wood oil acid polyhydric alcohol-polybasic acid resin with solvent naphtha, adding blown China-wood oil, adding a cobalt linoleate drier, mixing these ingredients, and cutting the varnish with high boiling gasoline.

9. In the process of producing a crystallizing varnish, the step which consists in the cold blending of heat treated China-wood oil with a solution of polyhydric alcohol-polybasic acid resin and a drier, the polyhydric alcohol-polybasic acid resin used being a reaction product of a polyhydric alcohol, a polybasic acid, and a member of the group which consists of drying oil acids, drying oils, and rosin.

10. The process of producing a crystallizing varnish which includes the steps of cutting a polyhydric alcohol-polybasic acid resin with an aromatic hydrocarbon solvent, adding heat treated China-wood oil and drier, mixing, and cutting with high boiling gasoline, the polyhydric alcohol-polybasic acid resin used being a reaction product of a polyhydric alcohol, a polybasic acid, and a member of the group which consists of drying oil acids, drying oils, and rosin.

11. A crystallizing varnish which comprises a mixture of a polyhydric alcohol-polybasic acid resin, heat treated China-wood oil, a drier, an aromatic hydrocarbon solvent, and a volatile aliphatic thinner, the polyhydric alcohol-polybasic acid resin used being a reaction product of a polyhydric alcohol, a polybasic acid, and a member of the group which consists of drying oil acids, drying oils, and rosin.

12. A crystallizing varnish which comprises a mixture of a polyhydric alcohol-polybasic acid resin, heat treated China-wood oil, drier, an aromatic hydrocarbon solvent and a volatile aliphatic thinner, the China wood oil and resin being in the ratio of approximately 2:1, the polyhydric alcohol-polybasic acid resin used being a reaction product of a polyhydric alcohol, a polybasic acid, and a member of the group which consists of drying oil acids, drying oils, and rosin.

13. A crystallizing varnish containing 19 parts by weight of a glycerol—phthalic anhydride—China-wood oil acids resin, 38 parts by weight of blown China-wood oil, 5.5 parts by weight of cobalt drier solution, 9.5 parts by weight of solvent naphtha, and 28 parts by weight of high boiling gasoline.

14. A coating composition capable of forming a frosted film on drying comprising blown China-wood oil, a drier, an organic solvent, and a polyhydric alcohol-polybasic acid resin made by reacting together a polyhydric alcohol, a polybasic acid, and a member of the group which consists of drying oil acids and rosin.

15. The process of forming a frosted film which comprises applying to an article of manufacture, a coating composition capable of frosting on drying, comprising blown China-wood oil, a drier, solvent naphtha, and a polyhydric alcohol-polybasic acid resin formed by reacting together glycerol, phthalic anhydride, and a member of the group which consists of drying oil acids and rosin.

16. The process of manufacturing baked ornamented articles which comprises applying to said articles a coating comprising blown China-wood oil, a drier, an organic solvent, and a polyhydric alcohol-polybasic acid resin formed by reacting together a polyhydric alcohol, a polybasic acid, and a member of the group which consists of drying oil acids and rosin, and baking said system at 100–150° C. to dry the coating and produce a frosted pattern.

WILLIAM O. STAUFFER.